United States Patent
Fleming et al.

(10) Patent No.: US 9,712,620 B2
(45) Date of Patent: *Jul. 18, 2017

(54) DYNAMIC PROXIMITY BASED NETWORKED STORAGE

(71) Applicant: International Business Machines Corporation, Armonk, NY (US)

(72) Inventors: Mark S. Fleming, Oro Valley, AZ (US); Steven E. McNeal, Tucson, AZ (US); Zhi Qiang Wei, Shanghai (CN); Gregory C. Windsor, Portland, OR (US); Jin Yu Xu, Shanghai (CN); Zhe Yi Zhu, Shanghai (CN)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/219,575

(22) Filed: Jul. 26, 2016

(65) Prior Publication Data

US 2016/0337452 A1 Nov. 17, 2016

Related U.S. Application Data

(63) Continuation of application No. 14/307,802, filed on Jun. 18, 2014, now Pat. No. 9,426,221.

(51) Int. Cl.
*G06F 15/167* (2006.01)
*H04L 29/08* (2006.01)
*G06F 12/14* (2006.01)

(52) U.S. Cl.
CPC ...... *H04L 67/1097* (2013.01); *G06F 12/1408* (2013.01); *H04L 67/18* (2013.01); *G06F 2212/1052* (2013.01); *G06F 2212/154* (2013.01); *G06F 2212/402* (2013.01)

(58) Field of Classification Search
CPC .............................. H04L 67/1097; H04L 67/18
USPC ........................................................ 709/213
See application file for complete search history.

(56) References Cited

U.S. PATENT DOCUMENTS

| 8,606,878 | B2 | 12/2013 | Ferris |
| 2010/0076933 | A1 | 3/2010 | Hamilton et al. |
| 2012/0173486 | A1 | 7/2012 | Park et al. |
| 2012/0214506 | A1 | 8/2012 | Skaaksrud et al. |
| 2012/0303740 | A1 | 11/2012 | Ferris |

(Continued)

OTHER PUBLICATIONS

Stuedi et al., "WhereStore: Location-based Data Storage for Mobile Devices Interacting with the Cloud", MCS '10: Proceedings of the 1st ACM Workshop on Mobile Cloud Computing & Services: Social Networks and Beyond, Jun. 2010, pp. 1-8, San Francisco, CA, USA.

(Continued)

*Primary Examiner* — Vivek Srivastava
*Assistant Examiner* — Karina J Garcia-Ching
(74) *Attorney, Agent, or Firm* — Daniel C. Housley

(57) ABSTRACT

A computer implemented method of storing data in at least one mobile node according to mobile node location may include identifying a first qualified mobile node and determining a first geographic position of the first qualified mobile node. The method may include determining a user geographic position of a user device, determining whether the first geographic position is within a first proximity relative to the user device, and causing storage of a first data portion in the first qualified mobile node in response to determining that the first geographic position is within the first proximity.

15 Claims, 10 Drawing Sheets

(56) References Cited

U.S. PATENT DOCUMENTS

| | | |
|---|---|---|
| 2013/0073670 A1 | 3/2013 | Das et al. |
| 2013/0246588 A1 | 9/2013 | Borowicz et al. |
| 2015/0341747 A1 | 11/2015 | Barrand et al. |
| 2015/0373108 A1 | 12/2015 | Fleming et al. |

OTHER PUBLICATIONS

Mell et al., "The NIST Definition of Cloud Computing", Recommendations of the National Institute of Standards and Technology, NIST Special Publication 800-145, Sep. 2011, 7 pages, US Department of Commerce, Gaithersburg, MD.

List of IBM Patents or Patent Applications Treated as Related, dated Jul. 21, 2016, pp. 1-2.

DYNAMIC PROXIMITY BASED NETWORKED STORAGE

BACKGROUND

The present disclosure relates to relate to proximity based data storage locations, and more specifically, to data storage in mobile nodes according to mobile node location.

Storage clouds have become a common method of storing data remotely. Remotely stored data offers the ability to store data in a remote location which is accessible from an Internet connection or other suitable connection. When a storage system, such as cloud storage, stores data, the location of where data is stored, relative to the location of a user, may affect the speed of data access for the user.

SUMMARY

According to embodiments of the present disclosure a computer implemented method of storing data in at least one mobile node according to mobile node location may include identifying a first qualified mobile node, determining a first geographic position of the first qualified mobile node, determining a user geographic position of the user device, determining whether the first geographic position is within a first proximity relative to the user device, and causing storage of a first data portion in the first qualified mobile node in response to determining that the first geographic position is within the first proximity.

The method may further include determining whether the first geographic position of the first qualified mobile node is within a second proximity relative to the user device in response to determining that the first geographic position is outside of the first proximity. The method may further include causing storage of the first data portion in the first qualified mobile node in response to determining that the first geographic position is within the second proximity. The method may further include determining whether the first geographic position of the first qualified mobile node has changed subsequent to storage of the first data portion, and freeing a memory capacity storing the first data portion in the first qualified mobile node in response to determining that a first changed geographic position of the first qualified mobile node is outside of the first proximity.

The method may further include maintaining the data stored in the first qualified mobile node in response to determining that the first changed geographic position is within a second proximity relative to the user device. The user device may be a mobile device and the method may further include determining whether the user geographic position of the user device has changed subsequent to storage of the first data portion. The method may further include freeing a memory capacity storing the first data portion in the first qualified mobile node in response to determining that the first geographic position of the first qualified mobile node is outside of the first proximity. The method may include maintaining the first data portion stored in the first qualified mobile node in response to determining that the first geographic position is within a second proximity relative to the user device.

The method may further include identifying a second qualified mobile node, and determining a second geographic position of the second qualified mobile node. The method may include determining whether the second geographic position is within the first proximity; and storing a second data portion of the data in the second qualified mobile node in response to determining that the second geographic position is within the first proximity. The first data portion may be stored in at least the first qualified mobile node and in the user device according to a redundant array of independent disks (RAID) format. Identifying a first qualified mobile node may include identifying a first mobile node and determining whether the first mobile node has an accessible capacity sufficient to store the data. The data is backup data. The method may further include displaying at least one attribute of the first qualified mobile node, the at least one attribute at least including geographic position of the first qualified mobile node and owner information for the first qualified mobile node.

Embodiments of the present disclosure may be directed to a system for storing data in at least one mobile node according to mobile node location, the system including a user device, a first mobile node, and a server coupled to the user device and the first mobile node through a network. The server may be configured to determine whether the first mobile node is qualified to store the data, determine a first geographic position of the first mobile node, determine a user geographic position of the user device, and determine whether the first geographic position is within a first proximity relative to the user device and Cause a data portion to be stored in the first mobile node in response to determining that the first geographic position is within the first proximity and determining that the first mobile node is qualified.

Embodiments of the present disclosure may be directed to a computer program product for storing data in at least one mobile node according to mobile node position, the computer program product comprising a computer readable storage medium having program instructions embodied therewith, the program instructions readable by a processor circuit. The program instructions may cause the processor circuit to determine whether a first mobile node is qualified to store the data, determine a first geographic position of the first mobile node, determine a first user geographic position of the user device, determine whether the first geographic position is within a first proximity relative to the user device, and cause the data to be stored in the first mobile node in response to determining that the first geographic position is within the first proximity and determining that the first mobile node is qualified.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
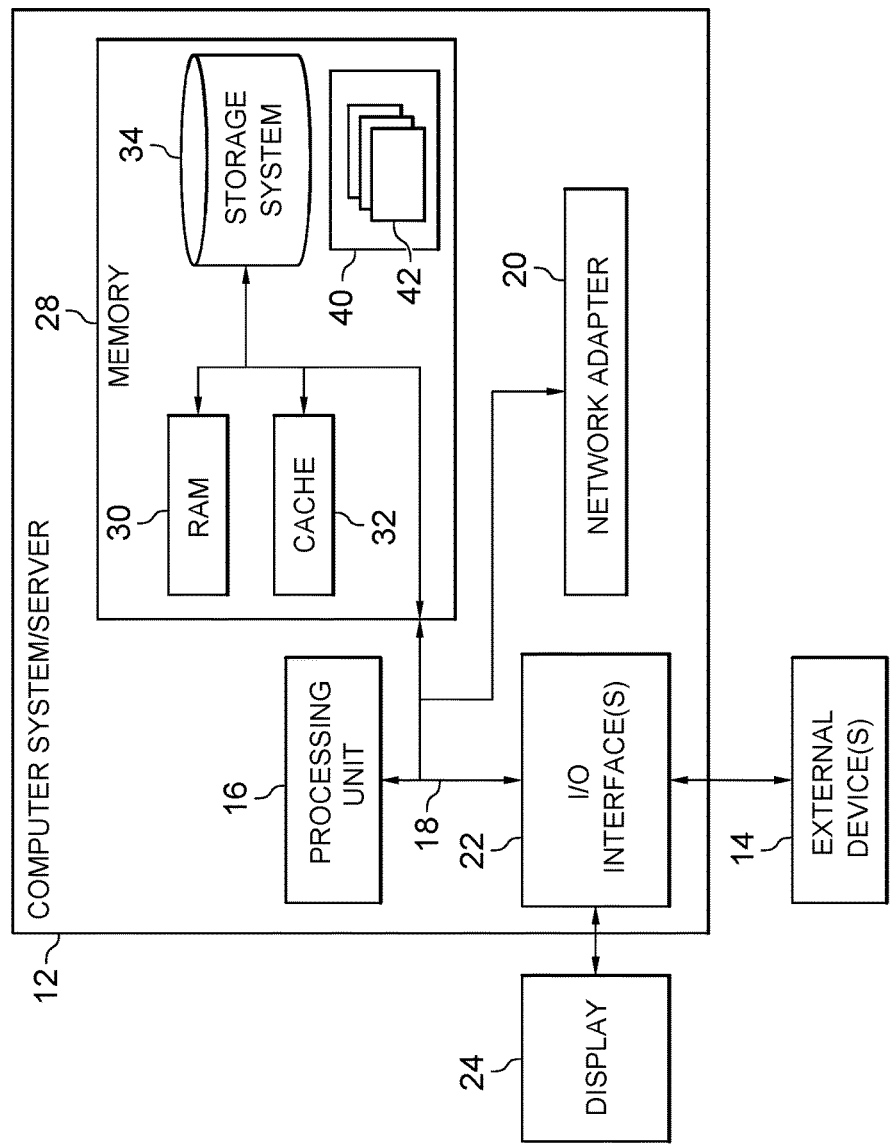
FIG. 1 depicts a cloud computing node according to an embodiment of the present disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to proximity based data storage locations, more particular aspects relate to data storage in mobile nodes according to mobile node location. While the present disclosure is not necessarily limited to such applications, various aspects of the disclosure may be appreciated through a discussion of various examples using this context.

Storage data across networked devices has become a common method of storing data remotely in a storage location. Once data is stored remotely, the data may be accessible from anywhere there is an Internet connection or connection to the storage location. However, the storage location may not be geographically close to the location the data is accessed from. Increased distance from the storage location may increase access times, and increase the chances that data won't be accessible.

Embodiments of the present disclosure are directed towards proximity based dynamic cloud storage which may distribute data among a number of geographically close mobile storage locations. Embodiments of the present disclosure may generate a storage network including multiple mobile nodes including smartphones, tablets, laptops, and other mobile devices. Storage networks may be created dynamically from mobile nodes within a specific proximity of a user. As the mobile nodes change in proximity to the user, data stored among the mobile nodes may be migrated to remain within the specific proximity. Placing the data on unused space in local proximity may decrease access times, improve reliability of access of data, and may utilize formerly underutilized sources of memory space in local mobile devices.

A computer implemented method of storing data in at least one mobile node according to mobile node location may include identifying a first qualified mobile node, determining a first geographic position of the first qualified mobile node, and determining a user geographic position of a user device. The method may include determining whether the first geographic position is within a first proximity relative to the user device. The method may include causing storage of a first data portion in the first qualified mobile node in response to determining that the first geographic position is within the first proximity.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
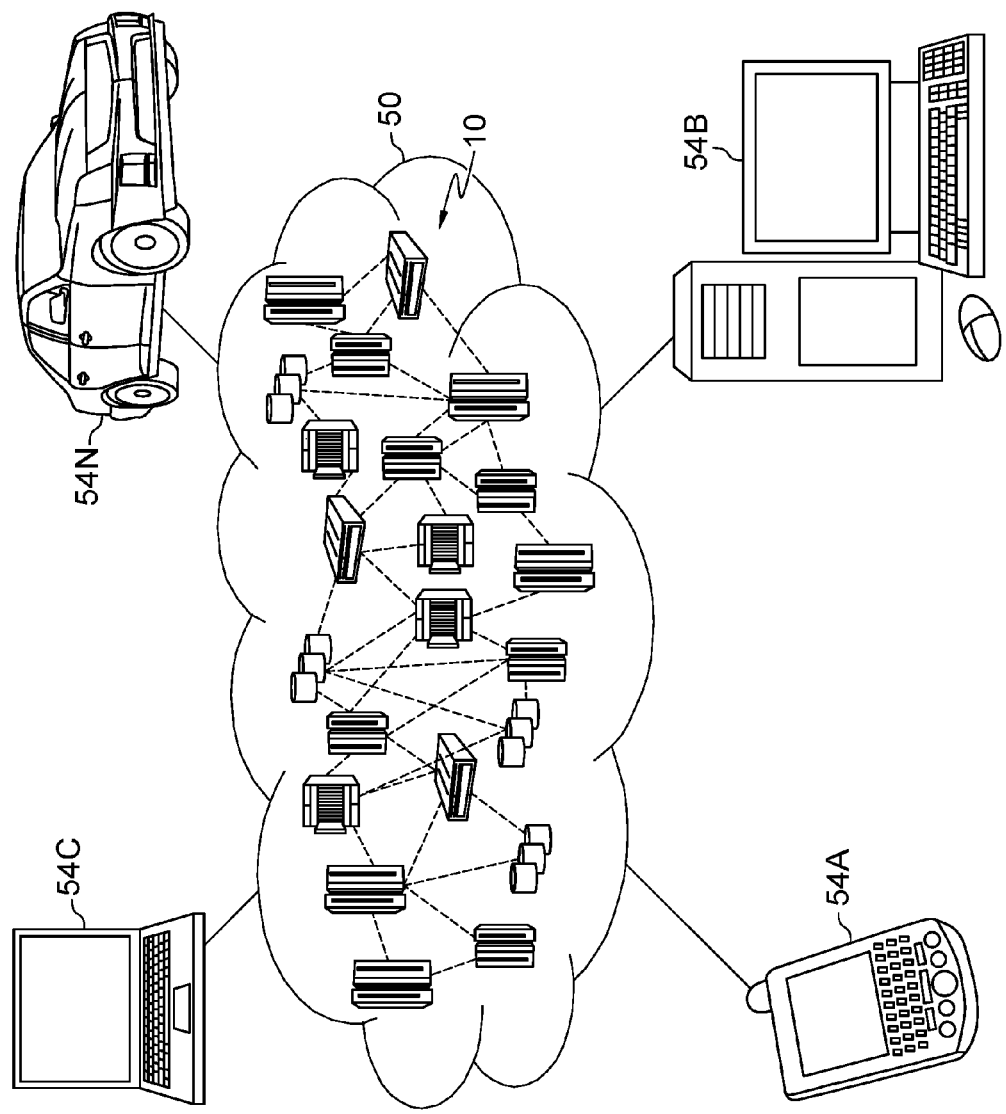
FIG. 2 depicts a cloud computing environment according to an embodiment of the present disclosure.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 4:
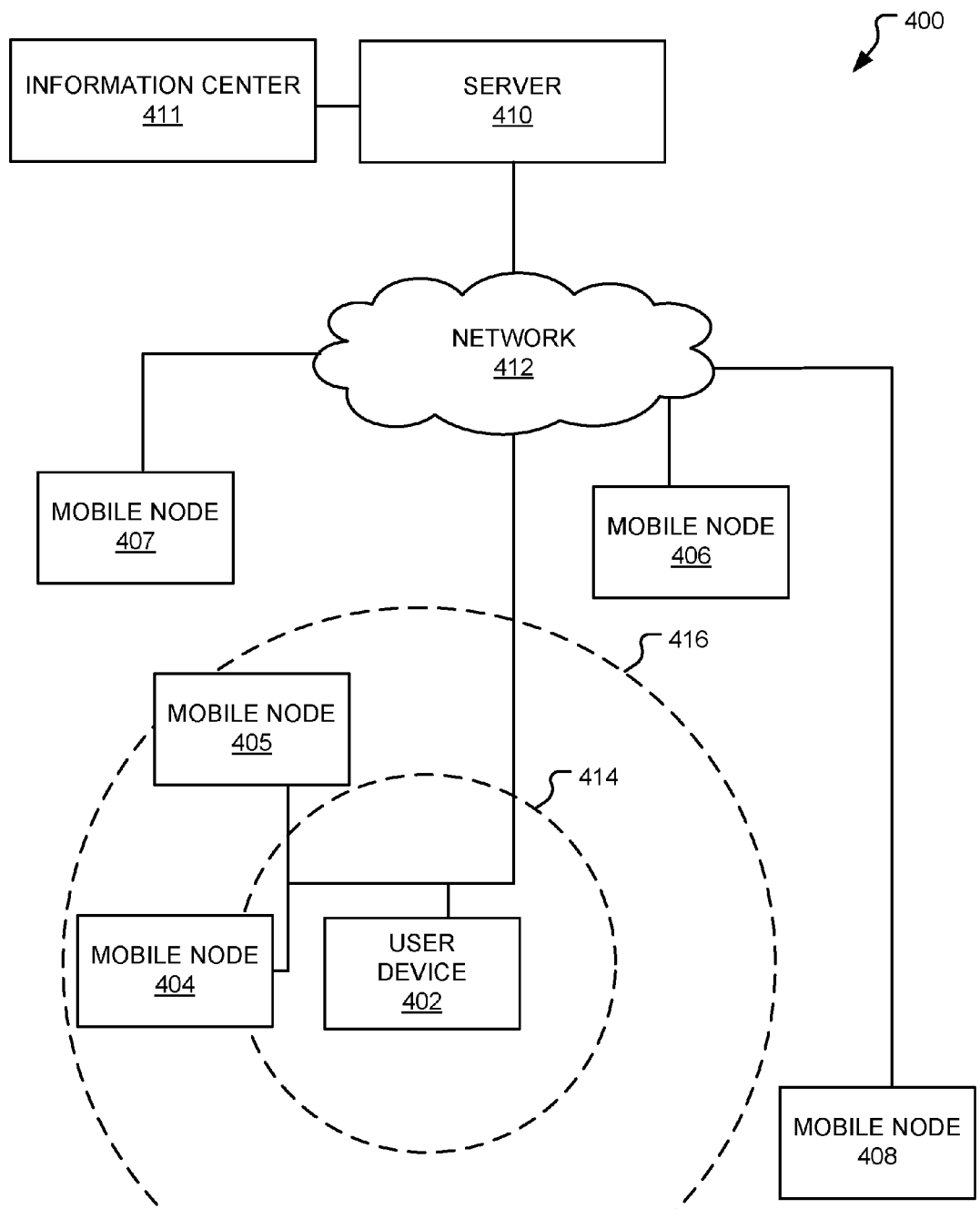
FIG. 4 depicts a dynamic, proximity-based, local storage system according to embodiments of the present disclosure.

Elements of FIG. 4, may relate to the elements as discussed with regard to FIG. 2. For example, in FIG. 4 the plurality of mobile nodes 404-408 may be seen as cloud computing nodes 10, the user device 402 may be seen as mobile phone 54A, and the cloud computing environment 50 may be seen as the network 412. However, it should be noted the cloud computing nodes 10 seen in FIG. 1 are geometrically fixed, unlike the mobile nodes 404-408 as seen in FIG. 4.

Figure 3:
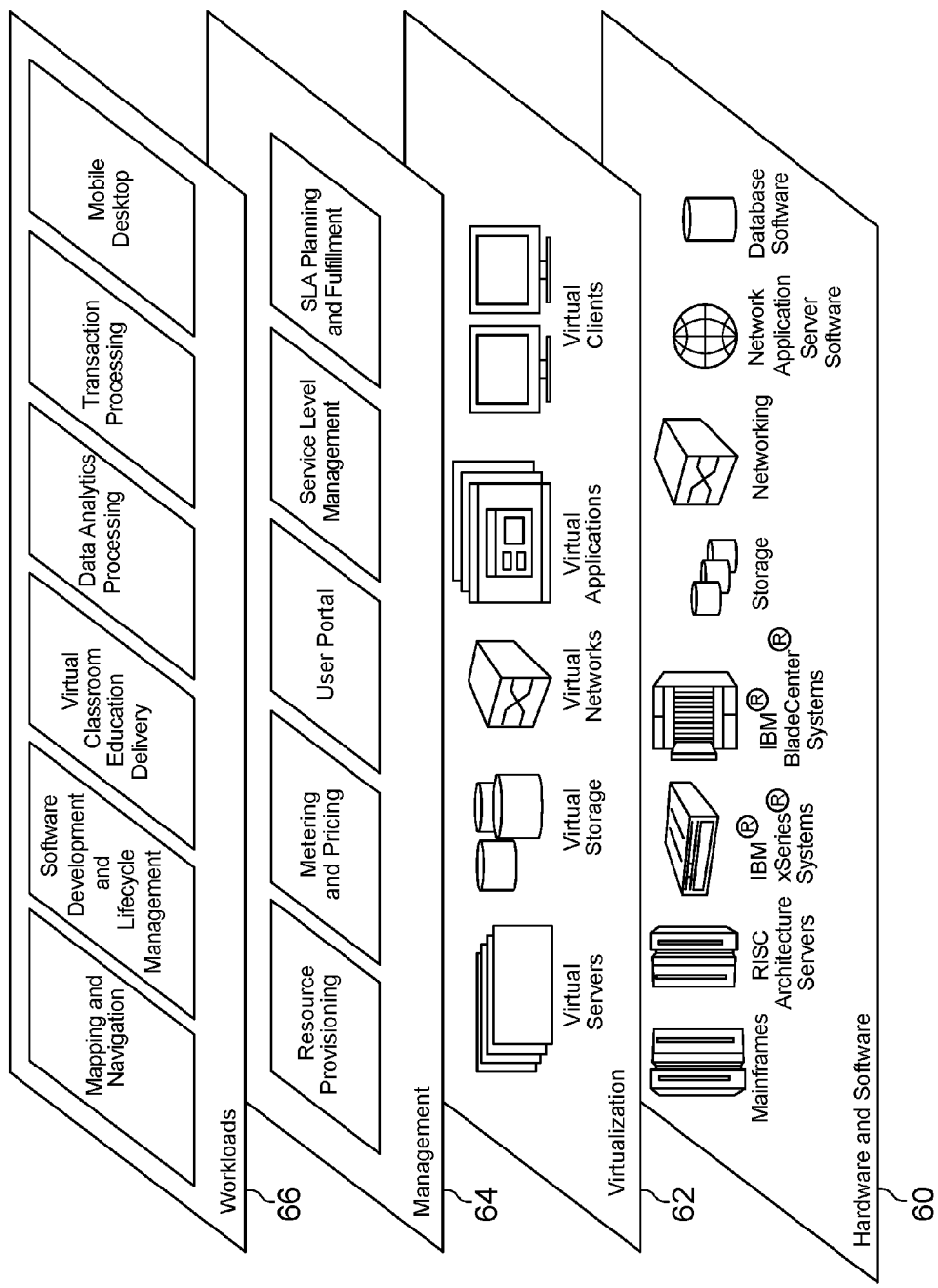
FIG. 3 depicts abstraction model layers according to an embodiment of the present disclosure.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 62 provides an abstraction layer from which the following examples of virtual entities may be provided: virtual servers; virtual storage; virtual networks, including virtual private networks; virtual applications and operating systems; and virtual clients. Virtual storage may include dynamic proximity based cloud storage, as described herein. For example, dynamic proximity based cloud storage may include storing data in one or more mobile nodes according to mobile node position, according to embodiments of the present disclosure.

In one example, management layer 64 may provide the functions described below. Resource provisioning provides dynamic procurement of computing resources and other resources that are utilized to perform tasks within the cloud computing environment.

Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and mobile desktop.

Referring now to FIG. 4 a dynamic, proximity-based, local storage system ("storage system") 400 is depicted according to embodiments of the present disclosure. The storage system 400 may include a user device 402, a plurality of mobile nodes 404-408, a server 410, an information center 411, and a network 412.

The user device 402 may be a computing device having memory and one or more processors. The user device 402 may store and access data, execute one or more processes, communicate via the network 404, and perform other functions. In embodiments, the user device 402 may be a mobile computing device such as a smart phone, tablet computer, laptop, smart watch, or other suitable mobile device. The memory of the user device 402 may store data, a user interface, executable software, a software client, and other data. The software client and the user interface may be used by the user device 402 to communicate with other devices in the storage system 400 and to manage storage of data in the user device 402, as described herein. In embodiments, the user device 402 may register with the information center 411 to store data, as described herein. The user device 402 may login via the software client to store data in the storage system 400, to access stored data in the storage system 400, and to manage data stored in the storage system 400. The user interface of the user device 402 may also display least one social attribute of one or more mobile nodes storing one or more data portions from the user device 402. Social attributes may at least include a geographic position of one or more mobile nodes, owner information for one or more mobile nodes in the storage system 400, and other social information. Thus, a user of the user device 402 may be able to identify where one or more data portions in the storage system 400 are geographically located, and other information.

The user device 402 may be coupled to the server 410, and the information center 411 using the network 412. The user device 402 may be coupled at various time to one or more of the plurality of mobile nodes 404-408.

The user device 402 may push one or more data portions contained in memory of the user device 402 to the server 410 and to the information center 411. The one or more data portions may include some or all of the data contained in memory of the user device 402. In embodiments, the one or more data portions may be a backup, of data contained in memory of the user device 402.

The data portions pushed to the information center 411 may be stored within the information center 411 and accessed by the user device 402 through the user interface and software client. The one or more data portions may be stored and accessed from within the information center 411, as long as authorized by the user device 402. Described further herein, the server 410 may additionally locate the one or more data portions within one or more of the plurality of mobile nodes 404-408, such that the user device has one or more data portions stored in a storage location within a specific first or second proximity 414, 416, relative to the device. Thus, access times to the one or more data portions may be decreased as the plurality of mobile nodes 404-408 may be relatively closer to the user device than the physical location of the information center 411.

The plurality of mobile nodes 404-408 may each be computing devices having memory and one or more processors. The plurality of mobile nodes 404-408 may each store and access data, execute one or more processes, communicate via the network 412, and perform other functions. The mobile nodes 404-408 may each be a mobile computing device such as a smart phone, tablet computer, laptop, smart watch, or other suitable mobile device. The memory of the plurality of mobile nodes 404-408 may store data, a user interface, executable software, a software client, and other data. The plurality of mobile nodes 404-408 may each use the software client and the user interface to communicate with other devices in the storage system 400 and manage participation in the storage system 400, as described herein. The plurality of mobile nodes 404-408 may use the software client to access the storage system 400 by entering login information, supply geographical location information as described herein, select access parameters, and perform other functions.

The user interface and client software may also be used to enter social attributes for use in the storage system 400. In embodiments, the storage system 400 may display geographic information for one or more mobile nodes which store one or more data portions in the storage system 400. In embodiments, contact information for users of the mobile nodes may also be displayed, along with other social attributes.

The plurality of mobile nodes 404-408 may have access parameters which define the extent of resources available from each mobile node to the storage system 400. The access parameter may include, accessible capacity of memory in the mobile node, availability times, maximum throughput of the data, maximum individual file size, and other various parameters. The plurality of mobile nodes 404-408 may communicate access parameters to the information center 411 and server 410. The Server 410 may keep track of the access parameters for each of the plurality of mobile nodes 404-408 and use the access parameters to determine which of the mobile nodes are qualified to store data, as described herein.

The accessible capacity of memory in the mobile nodes 404-408 may be a selected amount of memory, of the total memory of each of the plurality of mobile nodes 404-408, which is designated as available for the storage system 400. The mobile nodes 404-408 may store the one or more data portions in the accessible capacity in response to control of the server 410. In response to control of the server 410, the plurality of mobile nodes 404-408 may also provide access to stored data, such as the one or more data portions, in the accessible capacity. The one or more data portions may be stored and/or accessed in the accessible capacity by communication through the network 412 as described herein.

The user device 402 and the plurality of mobile nodes 404-408 may be located in various geographic positions. As the user device 402 and the plurality of mobile nodes may change geographic position from time to time as they are moved. For example, each of the plurality of mobile nodes may be smart phones, and the geographic position of the mobile nodes then may change as they are carried around. The storage and access of the one or more data portions in the plurality of mobile nodes 404-408 may be based on the geographic positions of each of the plurality of mobile nodes 404-408 relative to user device 402, as described herein. In embodiments, the storage and access of the one or more data portions in the plurality of mobile nodes 404-408 may also be based on the geographic position of the user device as the user device is moved and the geographic position changes.

Additionally, as the plurality of mobile nodes 404-408 may be powered computing devices, one or more of the plurality of mobile nodes 404-408 may be powered on or powered off at various times adding or removing mobile nodes from the storage system 400. In embodiments, the storage and access of the one or more data portions in the plurality of mobile nodes 404-408 may also be based on the availability of the mobile nodes as they are powered on or powered off within the storage system 400.

Server 410 may be a computing device having memory and one or more processors. The server 410 may store and access data, execute one or more processes, communicate via the network 404, and perform various other functions. In embodiments, the memory of the server 410 may be a computer readable storage medium containing program instructions as described herein. The server 410 may be communicatively coupled to the user device 402, the information center through the network 412, and the plurality of mobile nodes 404-408 through the network 412. In embodiments, the server 410 may be a designated computer separate from other devices in the storage system 400. In certain embodiments, the server may be a part of hardware and/or software in one or more of the devices in the storage system 400.

The server 410 may cause storage one or more data portions stored in the information center 411 to be stored in one or more of the plurality of mobile nodes 404-408. The server 410 may select specific mobile nodes 404-408 for storing the one or more data portions based on whether the mobile nodes are qualified to store data and based on the proximity of the mobile nodes 404-408 relative to the user device 402.

Each of the mobile nodes may be evaluated by the server 410 to determine whether it is qualified to store one or more data portions from the user device. To determine whether a mobile node is qualified, a grading scheme may be applied to attributes of the plurality of mobile nodes 404-408. The attributes of the mobile nodes 404-408 may include, but is not limited to, access parameters (as described herein), type of memory (e.g., flash memory versus hard disk drives), processing power, available RAM, remaining battery life, and other attributes.

The user device 402 may select one or more preferred attributes to define which mobile nodes may store one or more data portions. For example, the user device may select preferred attributes of flash memory and an accessible capacity greater than or equal to five hundred (500) Megabytes (MB). In embodiments, predetermined selections of preferred attributes may be defined as varying levels of service classes. The user device 402 may select a service class to quickly select one or more attributes which define qualified mobile nodes in the storage system 400.

The server 410 may determine which attributes each of the mobile nodes 404-408 have, and compare them to the preferred attributes of the user device 402. In embodiments, the server 410 may grade each mobile node based on how many preferred attributes it has. The more of the preferred attributes the mobile node possesses, the higher the grade. In certain embodiments, the server 410 may compare the number of preferred attributes to a threshold. For example, a user device 402 may have a threshold of eighty percent (80%) such that if a mobile node has at least 80% of the preferred attributes then the mobile node is a qualified mobile node. In certain embodiments, if a mobile node possesses all of the preferred attributes, then the mobile node is a qualified mobile node.

If a qualified mobile node loses one or more preferred attributes, then the server 410 may revoke the qualified status, and the mobile not may not be qualified to hold data. For example, a preferred attribute may be that the mobile node have greater than thirty percent battery life remaining. If a qualified mobile node has a remaining battery life which falls below thirty percent the server 410 then may revoke the mobile node's qualified status. In embodiments, the server may migrate one or more data portions stored in the formerly qualified mobile node to a different mobile node, described further herein.

Each mobile node may be analyzed to determine whether it is within the specific proximity relative to the user device 402. In order to determine the relative proximity of the mobile nodes 404-408, the server 410 may refer to a geographic position for each of the mobile nodes 404-408. The geographic position of the mobile nodes 404-408 may be determined automatically or be information entered manually.

Automatically entered geographic position information may be entered based on Internet Protocol (IP) address data, Global Positioning System (GPS) data, cell phone tower triangulation, or other suitable location data from the mobile nodes 404-408. In embodiments, the server 410 may automatically detect the geographic position of the user device 402 and each mobile node 404-408 when the user device 402 accesses the system 400. In certain embodiments, the server 410 may monitor the current location of the user device 402 and mobile nodes 404-408 at a regular interval and update the storage location of the at least one data portion based on one or more updated geographic positions determined at each interval.

Manually entered information may be provided using the user interface accessed by the mobile nodes 404-408 as described herein. A current location may be entered into the user interface to indicate the current geographic position of the mobile node. In certain embodiments, future locations may also be entered into the user interface to indicate a future location prior to movement of the mobile node 404-408. In embodiments, the server 410, may refer to the future location in determining whether to migrate data to a mobile node.

The server 410 may analyze the geographic position of each of the mobile nodes 404-408 and the user device 402 and determine whether each of the mobile nodes 404-408 are within a specific proximity relative to the user device 402. The server 410 may determine whether the mobile nodes have a geographic position within a first proximity 414 and/or a second proximity 416 relative to the user device 402. The first and second proximities 414, 416 may be selected as various distances which may allow the user device 402 relatively quick access of data within the storage system 400. In embodiments, the first proximity 414, may be selected as a distance which allows for direct transfer of data between the user device 402 and mobile nodes in the first proximity 414. For example, the first proximity 414 may be selected as approximately thirty (30) feet, such that a Bluetooth® connection may be made between the user device 402 and a mobile node within the first proximity 414. In certain embodiments, the first proximity 414 may be selected as approximately fifty (50) feet, such that a WiFi connection may be made between the user device 402 and a mobile node. The second proximity 416 may be selected as an upper distance limit for storage of data in the storage system 400. In embodiments, the second proximity 416 may be selected as ten (10) miles.

The server 410 may cause storage of one or more data portions in qualified mobile nodes which are within the specific proximity relative to the user device 402 as described above. In embodiments, the server may transfer one or more data portions in the information center 411 to the one or more qualified nodes via the network 412. In embodiments, the server 410 may issue a command to the user device 402 to transfer one or more data portions to the one or more qualified nodes via the network 412. Described further herein, the user device 402 may transfer the one or more data portions directly or indirectly, through the server 410, to the qualified mobile nodes. In certain embodiments, the server 410 may cause storage of a data subset of the one or more data portions which is more frequently accessed by the user device 402. An access threshold may determine which data is frequently accessed and which is not. For example, in embodiments, the server 410 may cause storage of a data subset which is accessed at least thirty percent (30%) more frequently than the other data in the one or more portions. Thus, the one or more data portions may remain stored in the information center 411, while the more frequently accessed data may be stored in the mobile nodes 404-408 for faster access.

In embodiments, the server 410 may refer to a storage policy when causing storage of one or more data portions in the mobile nodes 404-408. Due to the storage policy, the one or more data portions may be distributed in one mobile node or distributed among the plurality of mobile nodes 404-408. In certain embodiments, the server 410 may cause storage of one or more data portions of the data in a redundant array of independent disks (RAID) format. The RAID format may include storing the one or more data portions in the mobile nodes and the user device in a RAID 1, RAID 5, RAID 6, RAID 10, or other suitable RAID format. The storage policy may also include using encryption protocols known in the art to encrypt the one or more data portions stored in the mobile nodes. In embodiments, the server may utilize hash values to encrypt the one or more data portions. Thus, the one or more data portions may have encryption protection in the event of unauthorized access to the storage system 400 or the mobile nodes 404-408.

As the mobile nodes 404-408 move, and come on or offline, the server 410 may update the location of the one or more data portions in the qualified mobile nodes. The first and second proximities 414, 416 may be used to determine which mobile nodes are preferred for storing data. In embodiments, if there is a first mobile node 404 within the first proximity 414, and a second mobile node 405 within a second proximity, the server 410 may select the first mobile node 404 to store one or more data portions from the user device 402. This may result in data stored relatively closer to the user device 402 which may result in increased speed and efficiency in accessing data in the first mobile node. In certain embodiments, the server may select both the first and second mobile nodes 404, 405 for storage of the one or more data portions. This may result in a greater number of mobile nodes storing the one or more data portions and may result in increased safety of the data, as the data is stored in multiple independent locations.

Described further herein, as the mobile nodes move, the server 410 may dynamically update the location of the one or more data portions. For example, in embodiments, if the server 410 selects the first mobile node 404 to store one or more data portions, the server may then migrate the one or more data portions to both the first and second mobile nodes 404, 405 in response to movement of the first mobile node 404 placing it outside of the first proximity 414 and within the second proximity 416. In certain embodiments, the server may free memory in the first mobile node 404 in response to the first mobile node changing geographic position so that it is outside of the first and second proximities 414, 416. In some embodiments, if the server 410 selects the first mobile node 404 to store one or more data portions, the server may then migrate the one or more data portions to the second mobile node 405 in response to the first mobile node powering off and being removed from the storage system 400.

The information center 411 may store and provide access to the one or more data portions within the storage system 400. The user device may communicate with the information center via the software client and user interface to access and store data within the information center. The one or more data portions may be stored within the information center according to a cloud based storage policy as described herein. The one or more data portions may be continually stored and accessed from within the information center 411, as long as authorized by the user device 402. The server 410 may additionally locate the one or more data portions within one or more of the plurality of mobile nodes 404-408, such that the user device has one or more data portions stored in a storage location within a specific first or second proximity 414, 416, relative to the device.

The network 412 may communicatively couple the user device 402, the plurality of mobile nodes 404-408, and the server 410. The server 410, the user device 402, and the plurality of mobile devices 404-408 may be organized in the network 412 in a client server mode, however other types of models may be used. In embodiments, the network 412 may be connected wirelessly, using Wi-Fi, Bluetooth®, a cellular telephone network, or other suitable wireless connections. In embodiments, the network 412 may be a cloud based network as described herein.

In certain embodiments, the network may use wired connections, such as Ethernet cables, or other suitable wired connection. In embodiments, the network may be a plurality of networks including a combination of wired and wireless connections. In embodiments, the devices in the storage system 400 may be directly connected or indirectly connected through the server 410. For example, as a part of locating one or more data portions within the first or second proximity 414, 416, as described herein, the one or more data portions in the user device 402 may be transferred directly to a mobile node. In certain embodiments, the one or more data portions may first be transferred to the server 410 and then to the mobile node.

Figure 5A:
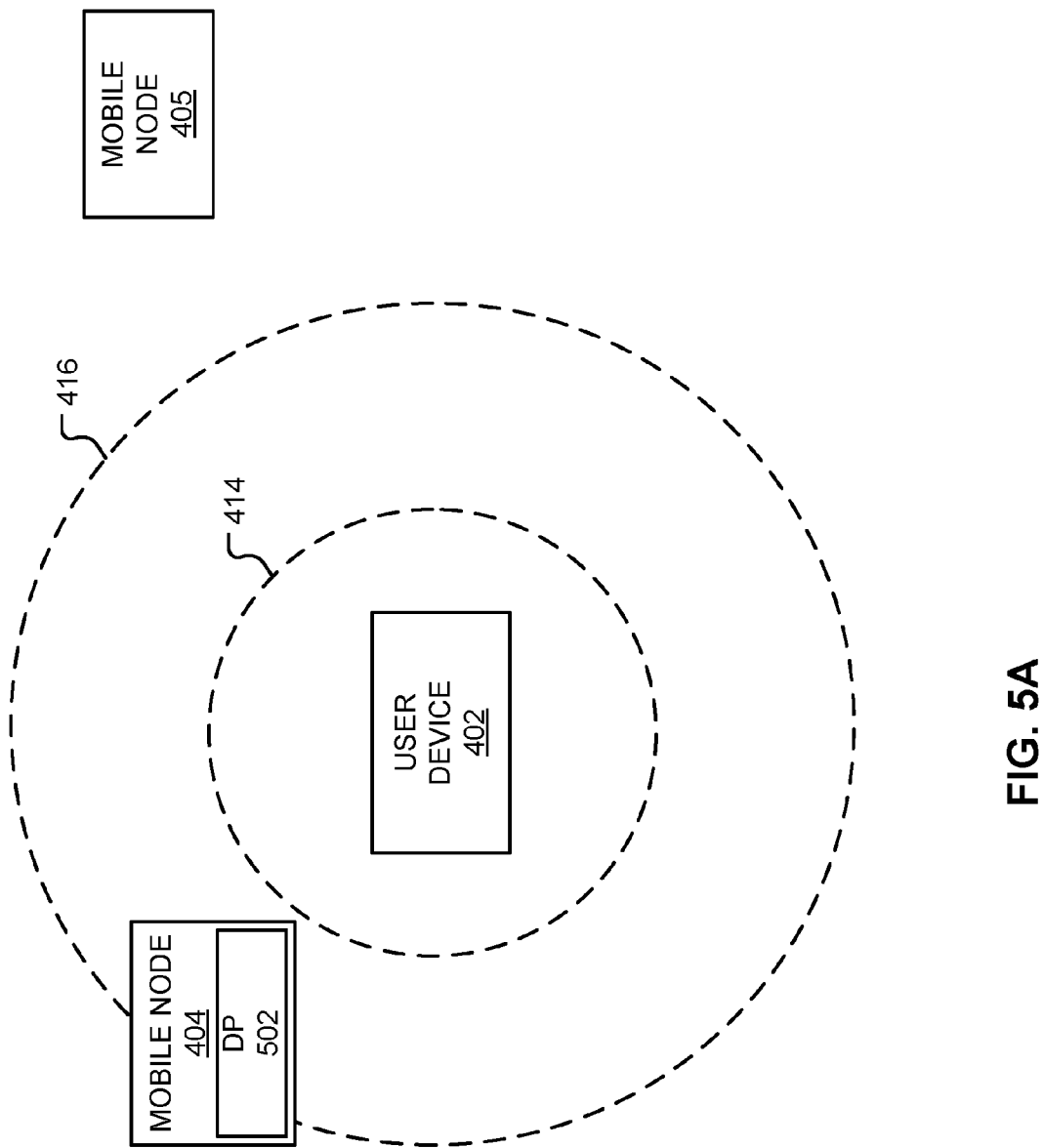
FIGS. 5A-5E depicts the user device and a first and a second mobile node in various geographic positions according to embodiments of the present disclosure.

Referring now to FIG. 5A, a user device 402 and a first and a second mobile node 404, 405 are seen in various geographic positions according to embodiments of the present disclosure. The user device 402 and the first and second mobile nodes 404, 405 may be the same or substantially similar as described herein. In FIGS. 5A-5E, the first and second mobile nodes 404, 405, are qualified mobile nodes, as described herein. A first proximity 414 and a second proximity 416 are marked showing area where one or more data portions may be stored by a storage system such as in FIG. 4.

The first mobile node has a first geographic position which places it within the second proximity 416 and outside of the first proximity 414. The second mobile node has a second geographic position which places it outside of the second proximity 416. According to embodiments, a data portion 502 may be stored in the first mobile node, as it is a qualified mobile node within the second proximity 416 and no other qualified mobile nodes are within the first or second proximities 414, 416. The data portion may be stored in the same or substantially similar manner as described herein. The data portion may be the same or substantially similar as described herein.

Figure 5B:
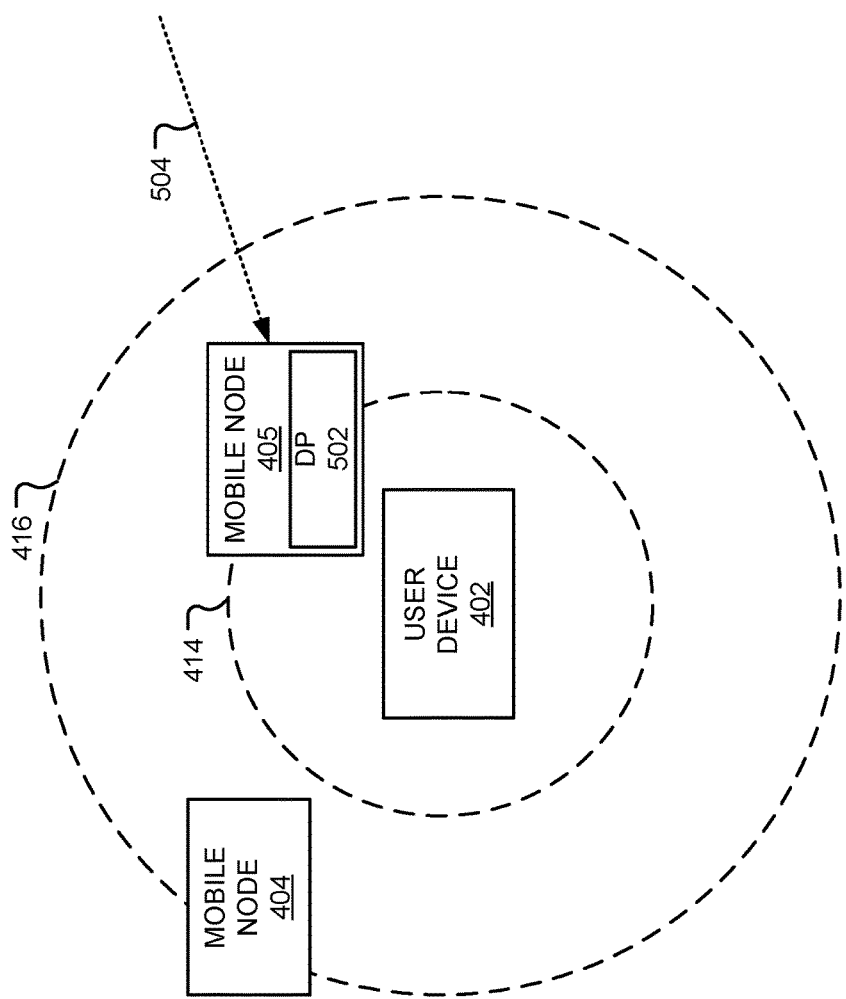

Referring now to FIG. 5B, a user device 402 and a first and second mobile node 404, 405 are seen in various geographic positions according to embodiments of the present disclosure. In FIG. 5B, the second mobile node 405 has a changed to a second geographic position, from FIG. 5A, along movement line 504. The changed second geographic position places the second mobile node 405 within the first proximity 414. According to embodiments of the disclosure, the storage system may prefer storing the one or more data portions in qualified mobile nodes within the first proximity 414. The storage system 400 (FIG. 4) may respond by migrating the data portion 502 from the first mobile node 404 (seen in FIG. 5A) to the second mobile node 405. In embodiments, the storage system 400 may free memory of the first mobile node 404 which stored the data portion 502. By migrating the data portion to a qualified mobile node within the first proximity, the data portion 502 may be placed relatively closer to the user device 402. This may increase access speeds of the user device as described herein. In certain embodiments, the storage system may respond to the changed second geographic position by keeping the data portion 502 in both the first mobile node 404 and the second mobile node 405. This may increase redundancy of the data portion 502, and may improve reliability of access by the user device 402 as described herein.

In embodiments freeing memory may include clearing the memory of the stored data portion 502. This may improve security for the data portion 502, as the data portion 502 is no longer available if storage encryption is breached in the first mobile node 404. In certain embodiments, freeing the memory may include marking the memory containing the data portion as available so that new data may be written over the data portion 502.

Figure 5C:
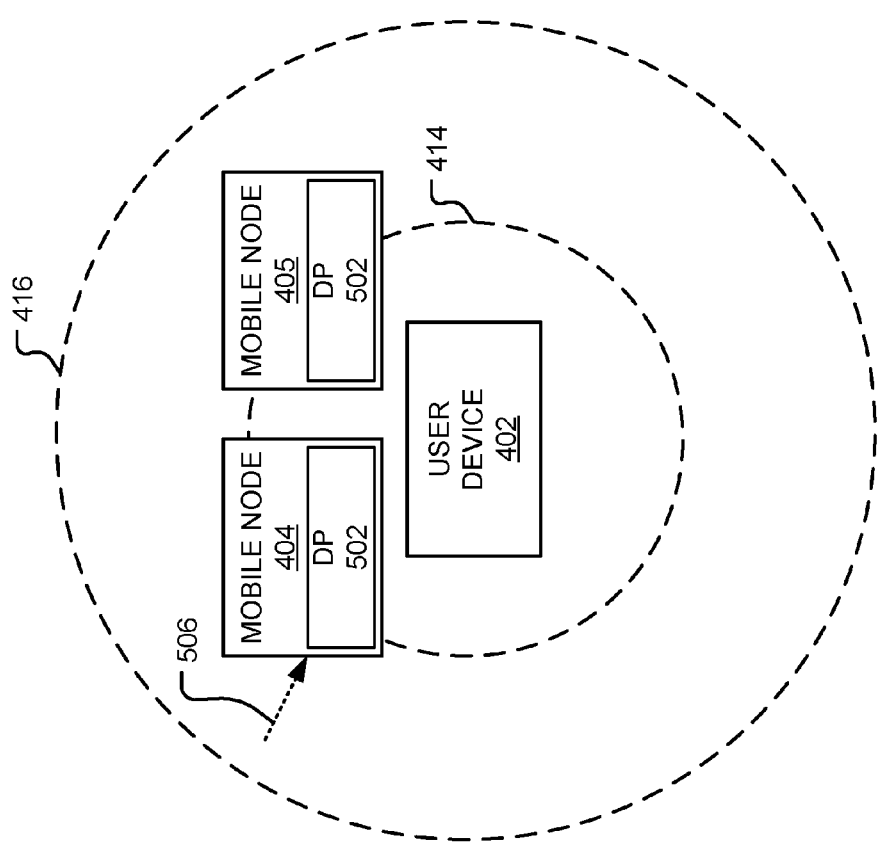

Referring now to FIG. 5C, a user device 402 and a first and second mobile node 404, 405 are seen in various geographic positions according to embodiments of the present disclosure. In FIG. 5C, the first mobile node 404 has a changed first geographic position, along movement line 506. The changed first geographic position places the first mobile node 404 within the first proximity 414. According to embodiments of the disclosure, the storage system may prefer storing the one or more data portions in qualified mobile nodes within the first proximity 414. Both the first and second mobile nodes are within the first proximity 414. In embodiments, the storage system may place the data portion 502 within both the first and second mobile nodes 404, 405. As described herein, the data portion may be organized according to in a storage policy which distributes the data portion 502 among the first and second mobile nodes 404, 405. In embodiments, the storage policy may distribute the data portion 502 in a RAID format, or other suitable format.

Figure 5D:
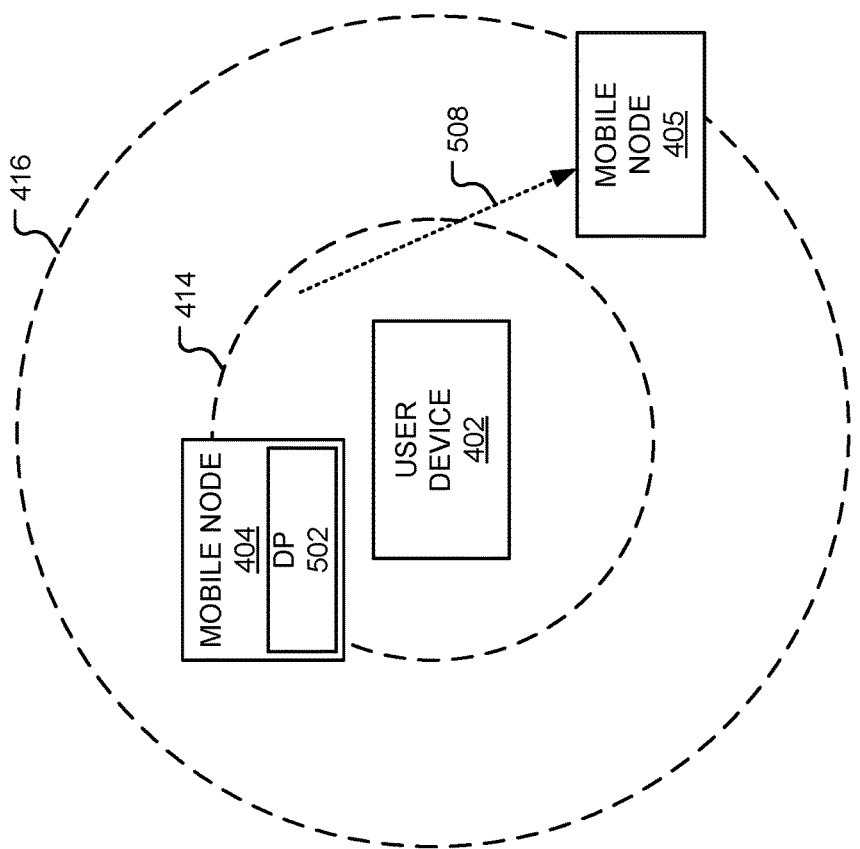

Referring now to FIG. 5D, a user device 402 and a first and second mobile node 404, 405 are seen in various geographic positions according to embodiments of the present disclosure. In FIG. 5D, the second mobile node 405 has a changed second geographic position, along movement line 508. The changed second geographic position places the second mobile node 405 outside of the first proximity 414 and within the second proximity 416. According to embodiments of the disclosure, the storage system 400 (FIG. 4) may respond by migrating the data portion 502 from the second mobile node 405 (as seen in FIG. 5C) to the first mobile node 404 and freeing memory of the second mobile node 405. This may keep the data portion relatively close to the user device 502 (within the first proximity 414) and may increase access speeds of the user device. In certain embodiments, the storage system 400 may respond to the changed second geographic position by keeping the data portion 502 in both the first mobile node 404 and the second mobile node. This may result in increased redundancy of the data portion, and may increase reliability of access of the data from the user device 402.

Figure 5E:
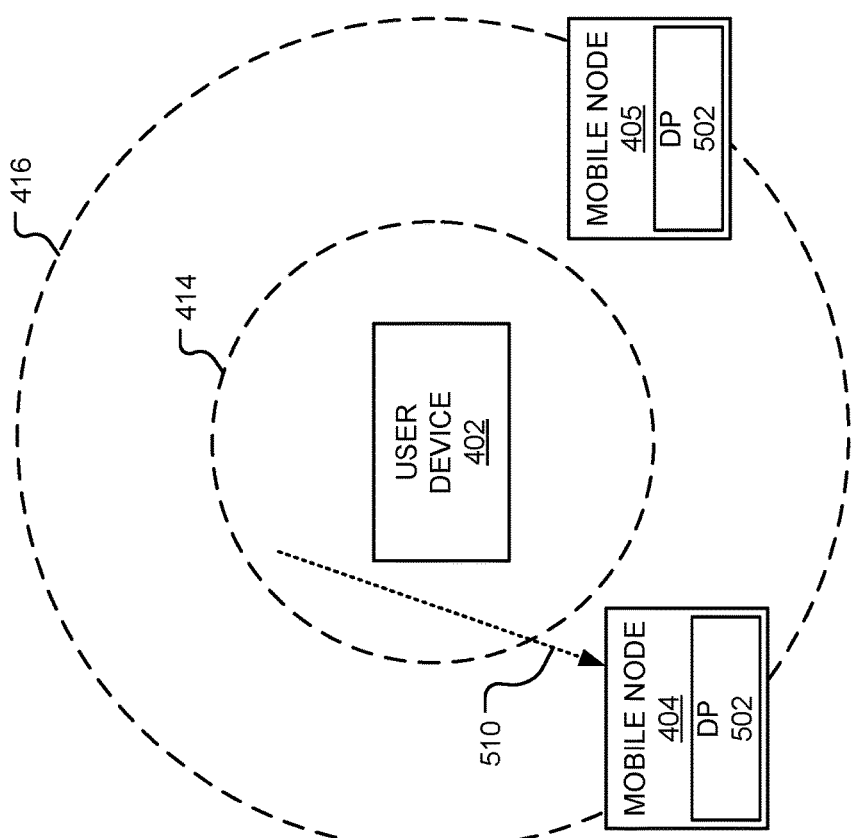

Referring now to FIG. 5E, a user device 402 and a first and second mobile node 404, 405 are seen in various geographic positions according to embodiments of the present disclosure. In FIG. 5E, the first mobile node 404 has a changed first geographic position, along movement line 510. The changed first geographic position places the first mobile node 404 outside of the first proximity 414 and within the second proximity 416.

According to embodiments of the disclosure, the storage system may prefer storing the one or more data portions in qualified mobile nodes within the first proximity 414. If there are no mobile nodes within the first proximity, then the system may prefer storing the data portion in mobile nodes within the second proximity. Both the first and second mobile nodes are within the first proximity 414. Thus, the storage system may place the data portion 502 within both the first and second mobile nodes 404, 405, as described herein. The data portion may be organized according to a storage policy which distributes the data portion 502 among the first and second mobile nodes 404, 405. In embodiments, the storage policy may distribute the data portion 502 in a RAID format, or other suitable format.

Figure 6:
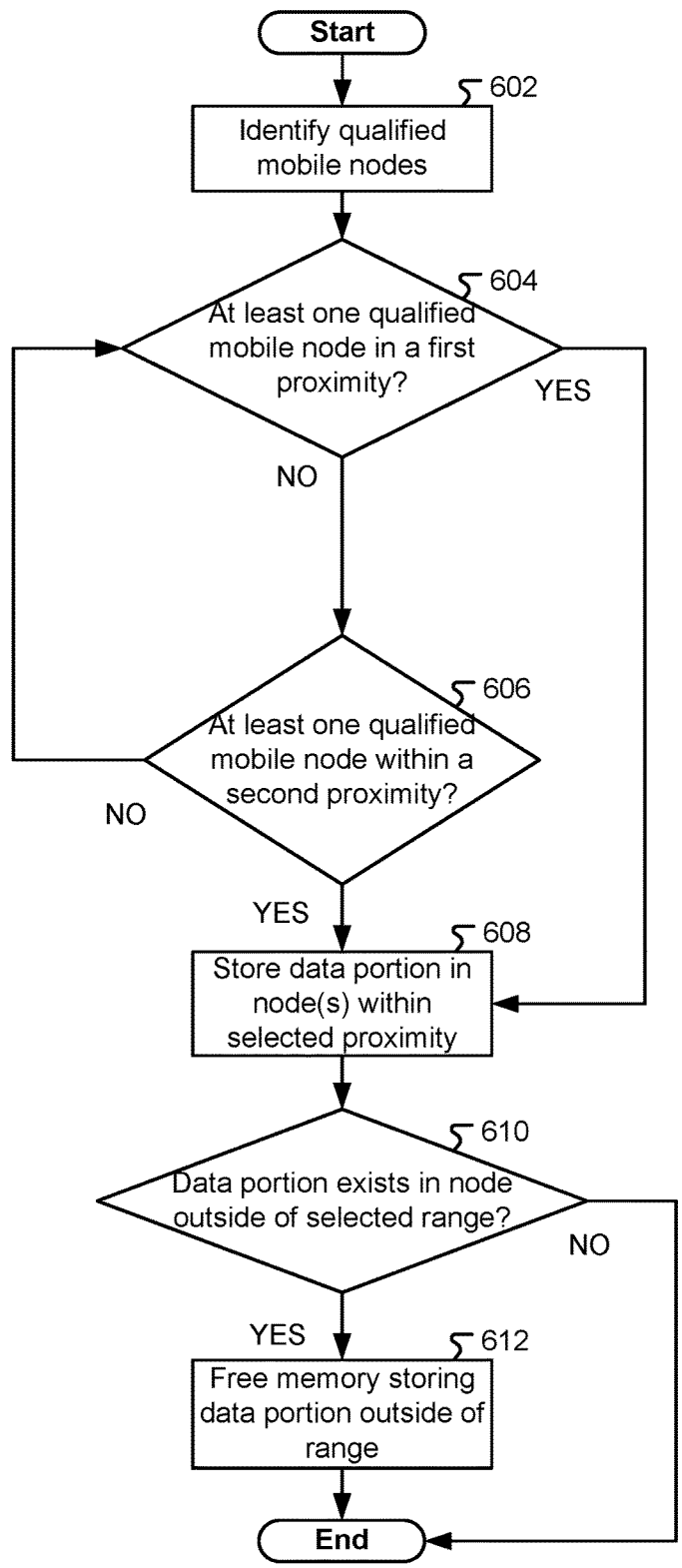
FIG. 6 depicts a flow chart diagram of a method of storing data in at least one mobile node according to mobile node location.

Referring now to FIG. 6, a flow chart diagram is depicted showing a method of storing data in at least one mobile node according to mobile node location. In operation 602, qualified mobile nodes may be identified. Qualified mobile nodes may be mobile nodes which are determined to be qualified to store one or more data portions in a storage system 400 (FIG. 4). Mobile nodes may be the same or substantially similar as described herein. Determining whether the mobile nodes are qualified to store one or more data portions may be the same or substantially similar as described herein. The mobile nodes may be distributed in various geographic positions as described herein. If one or more qualified nodes has a geographic position within a first proximity relative to a user device, then in decision block 604, the method may progress to operation 610 and one or more data portions may be stored within the qualified mobile nodes within the first proximity. The one or more data portions may be the same or substantially similar as described herein. The first proximity may be the same or substantially similar as described herein.

If no qualified mobile nodes have a geographic position within the first proximity, then in decision block 604 the method 600 may progress to decision block 606. If one or more qualified mobile nodes is within a second proximity, then in decision block 606, the method may progress to operation 608. If no qualified mobile node is within the second proximity, then the method may reset to decision block 604 and continue determining whether a qualified mobile node is within the first or second proximity. The second proximity may be the same or substantially similar as described herein.

In operation 608 the one or more data portions may be stored in one or more qualified mobile nodes in the first and/or second proximity. The storage of the one or more data portions may be the same or substantially similar as described herein.

If the one or more data portions are also stored in a mobile node outside of the first and/or second proximities, then in decision block 610, the method may progress to operation 612 and the memory of the mobile node storing the one or more data portions outside the first or second proximity may be freed. Freeing memory may be the same or substantially similar manner as described herein.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A computer program product for storing data in at least one mobile node according to mobile node position, the computer program product comprising a computer readable storage medium, wherein the computer readable storage medium is not a transitory signal per se, having program instructions embodied therewith, the program instructions readable by a processor circuit to cause the processor circuit to:

identify a first participating mobile node from a plurality of participating mobile nodes;

identify a set of user-selected attributes, including remaining battery life, access parameters, type of memory, processing power, and available RAM;

determine whether the first participating mobile node has at least one user-selected attribute from the set of user-selected attributes;

identify the first participating mobile node as a first qualified mobile node based on having the at least one user-selected attribute;

determine a first geographic position of the first qualified mobile node;

determine a user geographic position of a user device;

determine that there are no qualified mobile nodes positioned within a first proximity;

determine whether the first geographic position of the first qualified mobile node is within a second proximity relative to the user device in response to determining that there are no qualified mobile nodes within the first proximity;

cause storage of the first geographic position first data portion in the first qualified mobile node in response to determining that the first geographic position is within the second proximity;

monitor the user geographic position of the user device at a regular interval;

determine whether the user geographic position of the user device has changed subsequent to storage of a first data portion;

free a memory capacity storing the first data portion in the first qualified mobile node in response to determining that the first geographic position of the first qualified mobile node is outside of the second proximity; and maintain the first data portion stored in the first qualified mobile node in response to determining that the first geographic position is within the second proximity relative to the user device.

2. The computer program product of claim 1, wherein the first data portion is encrypted and stored in at least the first qualified mobile node and in the user device according to a redundant array of independent disks (RAID) format.

3. The computer program product of claim 1, wherein the program instructions further cause the processor circuit to:
identify a first mobile node;
determine whether the first mobile node has an accessible capacity sufficient to store the first data portion.

4. The computer program product of claim 1, wherein the first data portion is backup data.

5. The computer program product of claim 1, wherein the program instructions further cause the processor circuit to:
display, on a user interface of the user device, at least one attribute of the first qualified mobile node, the at least one attribute at least including geographic position of the first qualified mobile node and owner information for the first qualified mobile node.

6. The computer program product of claim 1, wherein the program instructions further cause the processor circuit to:
receive future location data for the first qualified mobile node, the future location data manually entered into a user interface; and
determine whether to migrate stored data portions associated with the participating mobile node based on the future location data.

7. The computer program product of claim 1, wherein the program instructions further cause the processor circuit to:
track access frequency of data portions from the user device, wherein the causing storage of the first data portion in the first qualified mobile node is further in response to determining that the first data portion is accessed more frequently portions associated with the user device.

8. A computer program product for storing data in at least one mobile node according to mobile node position, the computer program product comprising a computer readable storage medium, wherein the computer readable storage medium is not a transitory signal per se, having program instructions embodied therewith, the program instructions readable by a processor circuit to cause the processor circuit to:
identify a first participating mobile node from a plurality of participating mobile nodes;
identify a set of user-selected attributes, including remaining battery life, access parameters, type of memory, processing power, and available RAM;
determine whether the first participating mobile node has at least one user-selected attribute from the set of user-selected attributes;
identify the first participating mobile node as a first qualified mobile node based on having the at least one user-selected attribute; determine a first geographic position of the first qualified mobile node;
determine a user geographic position of a user device;
determine whether the first geographic position is within a first proximity relative to the user device;
cause a first data portion associated with the user device to be stored in the first qualified mobile node in response to determining that the first geographic position of the first qualified mobile node is within the first proximity relative to the user device;
monitor the user geographic position of the user device at a first regular interval;
determine whether the user geographic position of the user device has changed subsequent to storage of the first data portion;
free a memory capacity storing the first data portion in the first qualified mobile node in response to determining that the first geographic position of the first qualified mobile node is outside of the first proximity;
maintain the first data portion stored in the first qualified mobile node in response to determining that the first geographic position is within a second proximity relative to the user device;
monitor the first geographic position of the first qualified mobile node at a second regular interval;
determine whether the first geographic position of the first qualified mobile node has changed subsequent to storage of the first data portion; and
free the memory capacity storing the first data portion in the first qualified mobile node in response to determining that a first changed geographic position of the first qualified mobile node is outside of the first proximity.

9. The computer program product of claim 8, wherein the program instructions further cause the processor circuit to:
identify a second qualified mobile node;
determine a second geographic position of the second qualified mobile node;
determine whether the second geographic position is within the first proximity; and
store a second data portion of the data from the user device in the second qualified mobile node in response to determining that the second geographic position is within the first proximity.

10. The computer program product of claim 8, wherein the first data portion is encrypted and stored in at least the first qualified mobile node and in the user device according to a redundant array of independent disks (RAID) format.

11. The computer program product of claim 8, wherein the program instructions further cause the processor circuit to:
identify a first mobile node;
determine whether the first mobile node has an accessible capacity sufficient to store the first data portion.

12. The computer program product of claim 8, wherein the first data portion is backup data.

13. The computer program product of claim 8, wherein the program instructions further cause the processor circuit to:
display, on a user interface of the user device, at least one attribute of the first qualified mobile node, the at least one attribute at least including geographic position of the first qualified mobile node and owner information for the first qualified mobile node.

14. The computer program product of claim 8, wherein the program instructions further cause the processor circuit to:
receive future location data for the first qualified mobile node, the future location data manually entered into a user interface; and
determine whether to migrate stored data portions associated with the participating mobile node based on the future location data.

15. The computer program product of claim 8, wherein the program instructions further cause the processor circuit to:

track access frequency of data portions from the user device, wherein the causing storage of the first data portion in the first qualified mobile node is further in response to determining that the first data portion is accessed more frequently than other data portions associated with the user device.

* * * * *